(12) United States Patent
Oshima

(10) Patent No.: US 11,238,614 B2
(45) Date of Patent: Feb. 1, 2022

(54) CAMERA DEVICE, IMAGING SYSTEM, CONTROL METHOD, AND PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/777,283

(22) Filed: Jan. 30, 2020

(65) Prior Publication Data

US 2020/0167961 A1 May 28, 2020

Related U.S. Application Data

(63) Continuation of application No. 15/666,263, filed on Aug. 1, 2017, now Pat. No. 10,593,063, which is a
(Continued)

(30) Foreign Application Priority Data

Feb. 2, 2015 (JP) .................................. 2015-018641

(51) Int. Cl.
*G06T 7/80* (2017.01)
*G03B 17/00* (2021.01)
(Continued)

(52) U.S. Cl.
CPC ................ *G06T 7/80* (2017.01); *G03B 17/00* (2013.01); *G03B 17/561* (2013.01); *G03B 37/04* (2013.01);
(Continued)

(58) Field of Classification Search
CPC .. G06T 7/80; G06T 7/74; G06T 7/248; G03B 17/00; G03B 17/561; G03B 37/04;
(Continued)

(56) References Cited

U.S. PATENT DOCUMENTS 7,421,727 B2 9/2008 Oya et al.
8,174,581 B2 * 5/2012 Nakamura ............ G01S 3/7864
348/169
(Continued)

FOREIGN PATENT DOCUMENTS

CN 103210639 A 7/2013
JP 10-66057 A 3/1998
(Continued)

OTHER PUBLICATIONS

Chinese Office Action and Search Report for counterpart Chinese Application No. 201580074819.5, dated Sep. 27, 2019, with an English translation.
(Continued)

*Primary Examiner* — Joseph G Ustaris
*Assistant Examiner* — Jimmy S Lee
(74) *Attorney, Agent, or Firm* — Birch, Stewart, Kolasch & Birch, LLP

(57) ABSTRACT

A camera device according to an aspect of the invention includes an imaging unit, an imaging direction adjustment unit, a direction control unit that controls the imaging direction adjustment unit, a camera-side tracking processing unit that analyzes captured image data to acquire first target information indicating the position of a tracking target and outputs the first target information, a camera-side communication unit that receives second target information from a terminal device, and a camera-side target information correction unit that corrects the first target information on the basis of the second target information.

14 Claims, 9 Drawing Sheets

Related U.S. Application Data continuation of application No. PCT/JP2015/080741, filed on Oct. 30, 2015.

(51) Int. Cl.
| | |
|---|---|
| *G03B 17/56* | (2021.01) |
| *H04N 7/18* | (2006.01) |
| *G03B 37/04* | (2021.01) |
| *H04N 5/232* | (2006.01) |
| *G06T 7/73* | (2017.01) |
| *G06T 7/246* | (2017.01) |
| *G03B 15/00* | (2021.01) |

(52) U.S. Cl.
CPC .............. *G06T 7/248* (2017.01); *G06T 7/74* (2017.01); *H04N 5/23203* (2013.01); *H04N 5/23206* (2013.01); *H04N 5/23218* (2018.08); *H04N 5/23229* (2013.01); *H04N 5/23296* (2013.01); *H04N 5/23299* (2018.08); *H04N 5/232123* (2018.08); *H04N 5/232935* (2018.08); *H04N 7/188* (2013.01); *G03B 15/00* (2013.01); *H04N 5/23219* (2013.01); *H04N 5/23245* (2013.01)

(58) Field of Classification Search
CPC .............. G03B 15/00; H04N 5/23203; H04N 5/23206; H04N 5/23229; H04N 5/23296; H04N 5/23219; H04N 5/23245; H04N 7/188
USPC .......................................................... 348/169
See application file for complete search history.

(56) References Cited

U.S. PATENT DOCUMENTS

| | | | | |
|---|---|---|---|---|
| 8,320,618 | B2* | 11/2012 | Ikenoue | ................. G06T 7/277 |
| | | | | 382/103 |
| 8,866,888 | B2* | 10/2014 | Chen | ........................ G06T 7/80 |
| | | | | 348/46 |
| 9,357,126 | B2* | 5/2016 | Ishii | .................... H04N 5/23206 |
| 9,437,009 | B2* | 9/2016 | Medioni | ................. G06T 7/248 |
| 10,070,077 | B2* | 9/2018 | Westmacott | ........... H04N 7/188 |
| 2006/0055790 | A1 | 3/2006 | Chen et al. | |
| 2009/0256925 | A1* | 10/2009 | Yoshizumi | ......... H04N 5/23222 |
| | | | | 348/222.1 |
| 2009/0262197 | A1* | 10/2009 | Nakamura | ............ G01S 3/7864 |
| | | | | 348/169 |
| 2012/0262592 | A1* | 10/2012 | Rabii | ................. H04N 5/23296 |
| | | | | 348/208.16 |
| 2013/0293672 | A1* | 11/2013 | Suzuki | .................... G06F 3/041 |
| | | | | 348/36 |
| 2014/0049636 | A1* | 2/2014 | O'Donnell | ......... H04N 21/2662 |
| | | | | 348/143 |
| 2015/0286872 | A1* | 10/2015 | Medioni | ................... G06T 7/20 |
| | | | | 382/103 |
| 2015/0373414 | A1* | 12/2015 | Kinoshita | ........ H04N 5/232945 |
| | | | | 386/282 |

FOREIGN PATENT DOCUMENTS

| | | |
|---|---|---|
| JP | 2000-32435 A | 1/2000 |
| JP | 2003-46847 A | 2/2003 |
| JP | 2006-33188 A | 2/2006 |
| JP | 2014-175729 A | 9/2014 |

OTHER PUBLICATIONS

International Preliminary Report on Patentability and English translation of the Written Opinion of the International Searching Authority (Forms PCT/IB/326, PCT/IB/373 and PCT/ISA/237), dated Aug. 17, 2017, for corresponding International Application No. PCT/JP2015/080741.

International Search Report (Form PCT/ISA/210), dated Jan. 19, 2016, for corresponding International Application No. PCT/JP2015/080741.

Japanese Decision to Grant a Patent, dated Jun. 5, 2018, for corresponding Japanese Application No. 2016-573181, with an English machine translation.

Non-Final Office Action issued in copending U.S. Appl. No. 15/666,263, dated Jun. 18, 2019.

Notice of Allowance issued in copending U.S. Appl. No. 15/666,263, dated Oct. 31, 2019.

* cited by examiner

CAMERA DEVICE, IMAGING SYSTEM, CONTROL METHOD, AND PROGRAM

CROSS-REFERENCE TO RELATED APPLICATIONS

This application is a Continuation of copending application Ser. No. 15/666,263, filed on Aug. 1, 2017, which is a Continuation of PCT International Application No. PCT/JP2015/080741 filed on Oct. 30, 2015, which claims the benefit under 35 U.S.C. § 119(a) to Patent Application No. 2015-18641, filed in Japan on Feb. 2, 2015, all of which are hereby expressly incorporated by reference into the present application.

BACKGROUND OF THE INVENTION

1. Field of the Invention

The present invention a camera device, an imaging system, a control method, and a program, and more particularly, to a camera device, an imaging system, a control method, and a program that have a function of tracking an object.

2. Description of the Related Art

A tracking imaging technique which continuously captures images while tracking a specific object has come into widespread use in the field of, for example, a surveillance camera or a general digital camera. Various methods have been proposed as a method for specifying the position of a specific object as a tracking target. For example, a method has been known which performs image processing for collating the features of a tracking target with a captured image to specify the position of the tracking target in the image.

In addition, a technique has been known which exchanges information between a camera device with a function of tracking a tracking target and a remote terminal device to track the tracking target.

For example, JP2000-032435A discloses a system in which a camera device (camera) and a terminal device (monitor) are connected to each other by a transmission line and the terminal device is provided with an image processing unit that performs image processing for tracking a tracking target.

In recent years, the calculation processing capability of, for example, a smart phone and a tablet terminal has been rapidly improved and image processing for tracking a tracking target is performed, using the smart phone and the tablet terminal as terminal devices, to rapidly perform tracking with high accuracy.

SUMMARY OF THE INVENTION

However, as in the technique disclosed in JP2000-032435A, in a technique in which the image processing unit performing image processing for tracking is provided only in the terminal device, in some cases, when a communication state between the camera device and the terminal device is bad, tracking is not accurately performed. That is, since the communication state between the camera device and the terminal device is bad, it is difficult to transmit image data captured by the camera device which is required for image processing (tracking process) for tracking a tracking target and to transmit the analysis result of the tracking process performed by the terminal device. As a result, in some cases, it is difficult to accurately control the imaging direction of the camera device.

It is considered that the camera device performs the tracking process as measures in a case in which the communication state between the camera device and the terminal device is bad. However, in general, the calculation capability of the camera device is lower than the calculation capability of the smart phone or the tablet terminal used as the terminal device. Therefore, it is considered that, when the camera device performs the tracking process, the accuracy of tracking is reduced.

In addition, a method is considered which shifts the tracking process of the terminal device to the tracking process of the camera device in a case in which the communication state between the camera device and the terminal device is bad. However, when the camera device starts the tracking process again at the time of communication failure, it takes time to perform an initial operation for searching for the tracking target. As a result, it is difficult to smoothly track the tracking target.

The invention has been made in view of the above-mentioned problems and an object of the invention is to provide a camera device, an imaging system, a control method, and a program that enable a terminal device to rapidly perform image processing for tracking a tracking target with high accuracy in a case in which a communication state between the camera device and the terminal device is good and can smoothly continue to track the tracking target even in a case in which the communication state between the camera device and the terminal device is bad.

According to an aspect of the invention, there is provided a camera device comprising: an imaging unit that continuously acquires captured image data; an imaging direction adjustment unit that adjusts an imaging direction of the imaging unit; a direction control unit that controls the imaging direction adjustment unit; a camera-side tracking processing unit that analyzes the captured image data to acquire first target information indicating a position of a tracking target and outputs the first target information; a camera-side communication unit that can communicate with a terminal device which operates the camera device and receives second target information from the terminal device; and a camera-side target information correction unit that corrects the first target information on the basis of the second target information. In a case in which both the first target information and the second target information are input, the direction control unit controls the imaging direction adjustment unit on the basis of the second target information. In a case in which only one of the first target information and the second target information is input, the direction control unit controls the imaging direction adjustment unit on the basis of the input information of the first target information and the second target information.

According to this aspect, the imaging direction of the imaging unit is controlled on the basis of the first target information which is the analysis result of the captured image data by the camera device or the second target information which is the analysis result of the captured image data by the terminal device. Therefore, in this aspect, in a case in which a communication state between the camera device and the terminal device is good, tracking is rapidly performed with high accuracy on the basis of the second target information. Even in a case in which the communication state between the camera device and the terminal device is bad, the tracking target is continuously tracked on the basis of the first target information. According to this aspect, since the first target information is corrected on the basis of the second target information, it is possible to improve the accuracy of the first target information and to reduce the time required for the initial operation for detecting the tracking target again. The tracking process performed by the camera device in a case in which the communication state between the camera device and the terminal device is bad is smoothly shifted to the tracking process performed by the terminal device.

Preferably, on the basis of the first target information at a first time which is acquired by analyzing first captured image data acquired at the first time, the camera-side tracking processing unit analyzes second captured image data acquired at a second time after the first time to acquire the first target information at the second time. Preferably, in a case in which the first target information at the first time is corrected on the basis of the second target information, the camera-side tracking processing unit acquires the first target information at the second time on the basis of the corrected first target information at the first time.

According to this aspect, the first target information at the first time is corrected on the basis of the second target information at the first time and the first target information at the second time is acquired on the basis of the corrected first target information at the first time. Therefore, in this aspect, the camera device performs the tracking process on the basis of the corrected first target information. As a result, the camera device can accurately perform the tracking process.

Preferably, the camera-side target information correction unit substitutes the content of the first target information with the content of the second target information to correct the first target information.

According to this aspect, since the content of the first target information is substituted with the content of the second target information, it is possible to effectively correct the first target information with high accuracy.

Preferably, the camera-side target information correction unit determines whether to correct the first target information on the basis of a position of the tracking target specified on the basis of the first target information and a position of the tracking target specified on the basis of the second target information.

According to this aspect, since it is determined whether to correct the first target information on the basis of the position of the tracking target based on the first target information and the position of the tracking target based on the second target information, it is possible to effectively correct the first target information.

Preferably, the camera-side target information correction unit calculates a difference distance indicating a distance between the position of the tracking target specified on the basis of the first target information and the position of the tracking target specified on the basis of the second target information. Preferably, the camera-side target information correction unit corrects the first target information in a case in which the difference distance is equal to or greater than a first threshold value and does not correct the first target information in a case in which the difference distance is less than the first threshold value.

According to this aspect, it is determined whether to correct the first target information on the basis of the position of the tracking target based on the first target information and the position of the tracking target based on the second target information. Therefore, it is possible to effectively correct the first target information.

Preferably, the camera-side target information correction unit includes a timer and determines whether to correct the first target information on the basis of information from the timer.

According to this aspect, it is determined whether to correct the first target information on the basis of the information from the timer. Therefore, it is possible to stably correct the first target information.

Preferably, the camera-side target information correction unit periodically determines whether to correct the first target information.

According to this aspect, it is periodically determined whether to correct the first target information. Therefore, it is possible to stably correct the first target information.

Preferably, the terminal device further includes a frame rate monitoring unit that monitors a frame rate of the captured image data transmitted to the camera-side communication unit.

According to this aspect, since the terminal device with which the camera device communicates is provided with the frame rate monitoring unit, it is possible to accurately check the communication state between the camera device and the terminal device.

Preferably, the camera-side target information correction unit does not correct the first target information in a case in which the frame rate monitored by the frame rate monitoring unit is equal to or less than a second threshold value.

According to this aspect, in a case in which the frame rate monitored by the frame rate monitoring unit is equal to or less than the second threshold value, the first target information is not corrected since the reliability of the first target information is reduced. Therefore, in a case in which the accuracy of the second target information calculated by the terminal device is high, it is possible to correct the first target information.

Preferably, the terminal device includes a terminal-side target information correction unit that corrects the second target information on the basis of the first target information. Preferably, in a case in which, after the frame rate monitored by the frame rate monitoring unit is equal to or less than the second threshold value, the frame rate is equal to or greater than a third threshold value, the terminal-side target information correction unit corrects the second target information.

According to this aspect, in a case in which, after the communication state between the camera device and the terminal device is bad, the communication state between the camera device and the terminal device is good, the second target device of the terminal device is corrected on the basis of the first target information of the camera device. Therefore, in this aspect, it is possible to reduce the time required for the terminal device that detects a tracking target to perform the initial operation. As a result, the terminal device can rapidly perform the tracking process with high accuracy.

Preferably, a plurality of the terminal devices are connected to the camera device through terminal-side communication units of the plurality of terminal devices. Preferably, the terminal-side communication unit of each of the plurality of terminal devices outputs information of the frame rate monitored by the frame rate monitoring unit and the second target information. Preferably, the camera-side target information correction unit compares the information items of the frame rates output from the terminal-side communication units of the terminal devices and corrects the first target information on the basis of the second target information which is output from the terminal-side communication unit of a terminal device with the highest frame rate.

According to this aspect, the first target information is corrected on the basis of the second target information of the terminal device with the highest frame rate among the plurality of terminal devices that communicate with the camera device. Therefore, it is possible to correct the first target information with high accuracy.

Preferably, the camera device further comprises a communication monitoring unit that monitors a communication state with the terminal device.

According to this aspect, since the terminal device includes the communication monitoring unit monitoring the communication state, it is possible to detect the communication state between the camera device and the terminal device with high accuracy.

Preferably, the camera-side target information correction unit does not correct the first target information in a case in which the communication state monitored by the communication monitoring unit is a disconnected state.

According to this aspect, in a case in which the communication state monitored by the communication monitoring unit of the terminal device is the disconnected state, the first target information is not corrected. Therefore, it is possible to accurately correct the first target information.

Preferably, the terminal device includes a terminal-side target information correction unit that corrects the second target information on the basis of the first target information. Preferably, the terminal-side target information correction unit corrects the second target information in a case in which, after the communication state monitored by the communication monitoring unit changes to the disconnected state, the communication state changes to a reconnected state.

According to this aspect, in a case in which, after the communication between the camera device and the terminal device changes to a bad state, the communication between the camera device and the terminal device changes to a good state, the second target information of the terminal device is corrected on the basis of the first target information of the camera device. Therefore, in this aspect, it is possible to reduce the time required for the terminal device that detects a tracking target to perform the initial operation. As a result, the terminal device can rapidly perform the tracking process with high accuracy.

According to another aspect of the invention, there is provided an imaging system comprising a camera device and a terminal device. The camera device includes: an imaging unit that continuously acquires captured image data; an imaging direction adjustment unit that adjusts an imaging direction of the imaging unit; a direction control unit that controls the imaging direction adjustment unit; a camera-side tracking processing unit that analyzes the captured image data to acquire first target information indicating a position of a tracking target and outputs the first target information; a camera-side communication unit; and a camera-side target information correction unit that corrects the first target information on the basis of second target information. The terminal device includes: a terminal-side communication unit that can communicate with the camera-side communication unit; and a terminal-side tracking processing unit that analyzes the captured image data to acquire the second target information indicating the position of the tracking target and outputs the second target information through the terminal-side communication unit. The camera-side communication unit outputs the received second target information. In a case in which both the first target information and the second target information are received, the direction control unit controls the imaging direction adjustment unit on the basis of the second target information. In a case in which only one of the first target information and the second target information is received, the direction control unit controls the imaging direction adjustment unit on the basis of the received information of the first target information and the second target information.

According to still another aspect of the invention, there is provided a method for controlling a camera device comprising an imaging unit that continuously acquires captured image data, an imaging direction adjustment unit that adjusts an imaging direction of the imaging unit, a direction control unit that controls the imaging direction adjustment unit, a camera-side tracking processing unit that analyzes the captured image data to acquire first target information indicating a position of a tracking target and outputs the first target information, a camera-side communication unit that can communicate with a terminal device which operates the camera device and receives second target information from the terminal device, and a camera-side target information correction unit that corrects the first target information on the basis of the second target information. The method comprises: in a case in which both the first target information and the second target information are input, controlling the imaging direction adjustment unit on the basis of the second target information; and, in a case in which only one of the first target information and the second target information is input, controlling the imaging direction adjustment unit on the basis of the input information of the first target information and the second target information.

According to yet another aspect of the invention, there is provided a program that causes a computer to perform a method for controlling a camera device comprising an imaging unit that continuously acquires captured image data, an imaging direction adjustment unit that adjusts an imaging direction of the imaging unit, a direction control unit that controls the imaging direction adjustment unit, a camera-side tracking processing unit that analyzes the captured image data to acquire first target information indicating a position of a tracking target and outputs the first target information, a camera-side communication unit that can communicate with a terminal device which operates the camera device and receives second target information from the terminal device, and a camera-side target information correction unit that corrects the first target information on the basis of the second target information. The method includes: in a case in which both the first target information and the second target information are input, controlling the imaging direction adjustment unit on the basis of the second target information; and in a case in which only one of the first target information and the second target information is input, controlling the imaging direction adjustment unit on the basis of the input information of the first target information and the second target information.

According to the invention, the imaging direction of the imaging unit is controlled on the basis of the first target information which is the analysis result of the captured image data by the camera device or the second target information which is the analysis result of the captured image data by the terminal device. Therefore, in the invention, in a case in which a communication state between the camera device and the terminal device is good, tracking is rapidly performed with high accuracy on the basis of the second target information. Even in a case in which the communication state between the camera device and the terminal device is bad, the tracking target is continuously tracked on the basis of the first target information. According to the invention, since the first target information is corrected on the basis of the second target information, it is possible to improve the accuracy of the first target information and to reduce the time required for the initial operation for detecting the tracking target again. The tracking process performed by the camera device in a case in which the communication state between the camera device and the terminal device is bad is smoothly shifted to the tracking process performed by the terminal device.

DESCRIPTION OF THE PREFERRED EMBODIMENTS

Hereinafter, preferred embodiments of the invention will be described with reference to the accompanying drawings.

Figure 1:
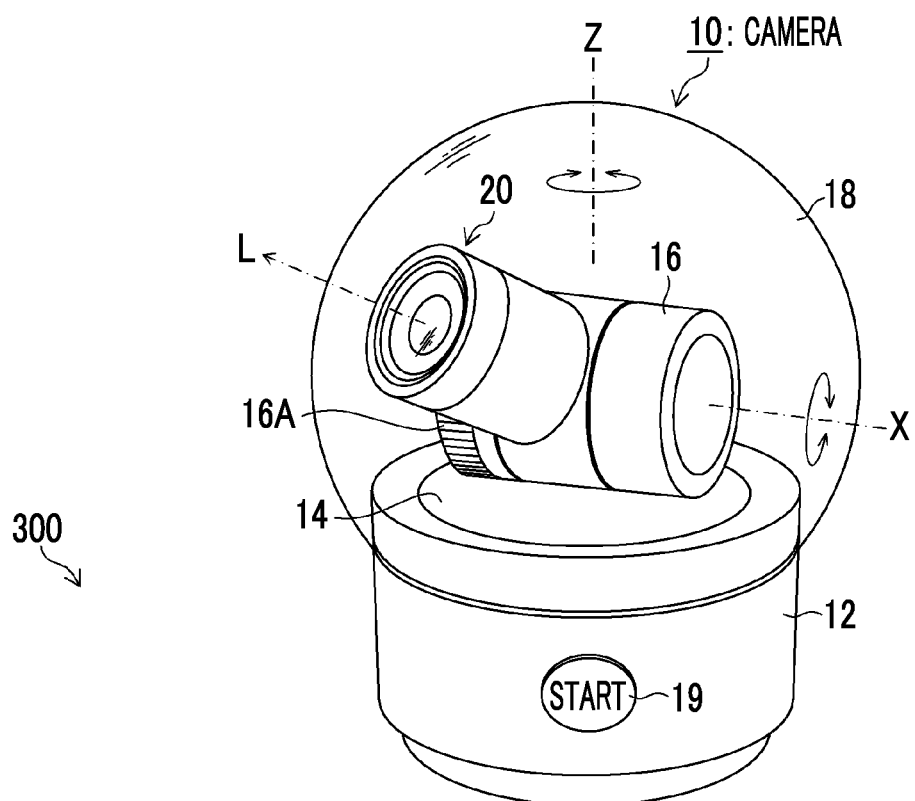
FIG. 1 is an external perspective view illustrating an example of an imaging system.
Figure 1:
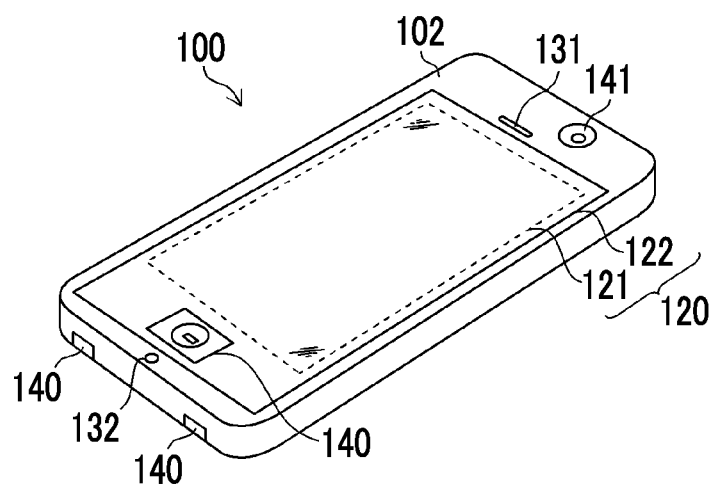

FIG. 1 is an external perspective view illustrating an example of an imaging system 300 according to an aspect of the invention. The imaging system 300 comprises a terminal device 100 (smart phone) and a camera device 10 (pan/tilt camera).

The terminal device 100 is used to operate the camera device 10. In the example shown in FIG. 1, the terminal device 100 wirelessly operates the camera device 10. However, the invention is not limited thereto. The terminal device 100 may be connected to the camera device 10 in a wired manner.

The camera device 10 mainly includes a device body 12, a base 14, a holding portion 16 which is fixed to the base 14 and holds an imaging unit 20 so as to be rotatable, and a dome cover 18 which covers the imaging unit 20.

Figure 2:
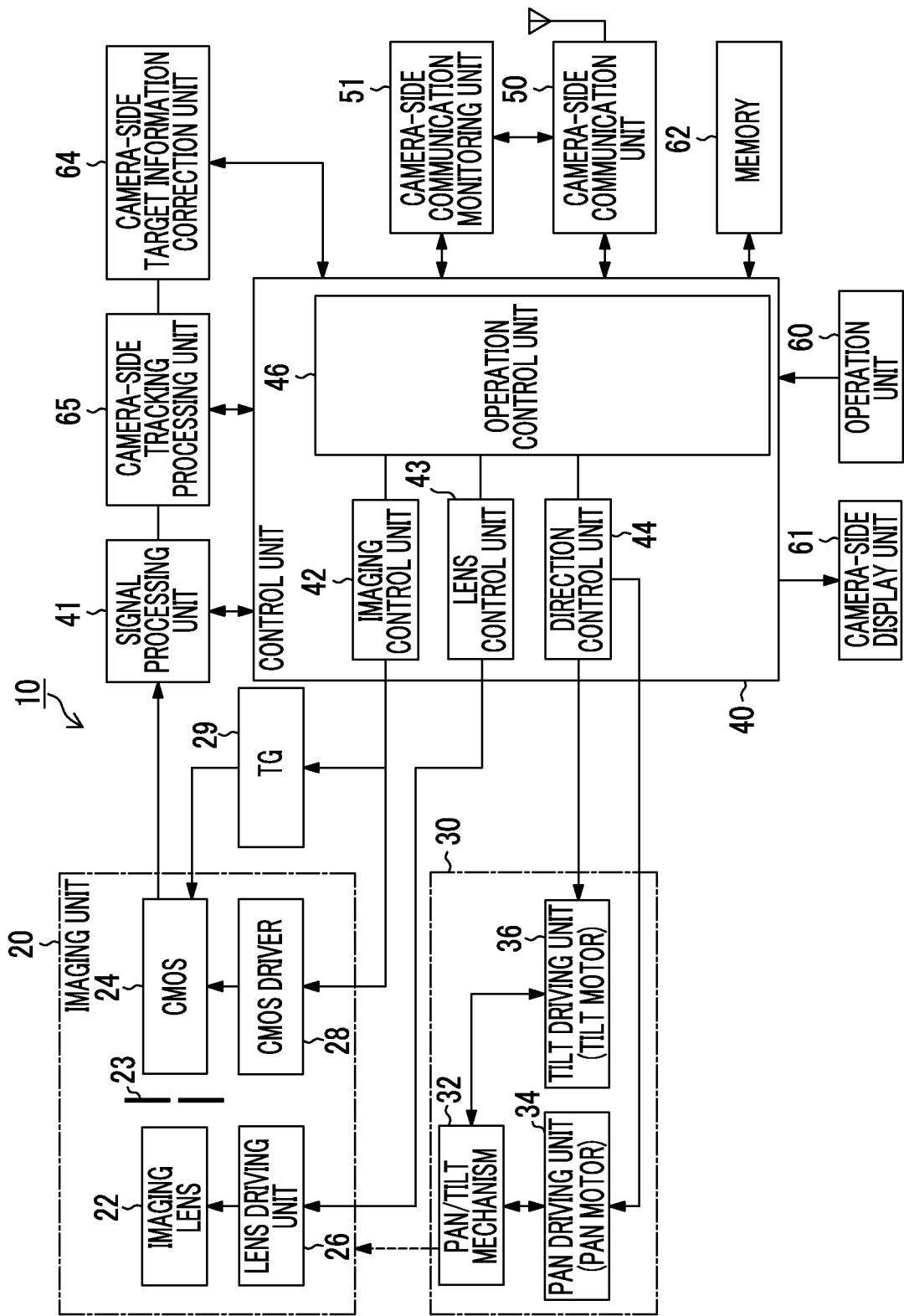
FIG. 2 is a block diagram illustrating an example of the functional structure of a camera device.

The base 14 is provided so as to be rotatable about the axis of the vertical direction Z of the device body 12 and is rotated about the axis of the vertical direction Z by a pan driving unit 34 (FIG. 2).

The holding portion 16 includes a gear 16A that is provided on the same axis as the horizontal direction X. A driving force is transmitted from a tilt driving unit 36 (FIG. 2) through the gear 16A to rotate (tilt) the imaging unit 20 in the vertical direction.

The dome cover 18 is a dustproof and drip-proof cover and preferably has a domic shape which has a constant thickness and has, as a center of curvature, an intersection point between the axis of the horizontal direction X and the axis of the vertical direction Z such that the optical performance of the imaging unit 20 does not change, regardless of an optical axis direction L of the imaging unit 20.

It is preferable to provide a tripod attachment portion (for example, tripod screws) (not illustrated) on the rear surface of the device body 12.

The camera device 10 is provided with an imaging start button 19 that instructs to start imaging and a power switch (not illustrated). The camera device 10 includes a camera-side communication unit 50 (FIG. 2) and mainly receives various types of operation instructions input from an external terminal device (a smart phone in this example) 100 using wireless communication with the terminal device 100. The camera device 10 acquires information related to the position of a tracking target obtained by analyzing captured image data from the terminal device 100, using wireless communication. The terminal device 100 will be described with reference to FIG. 3.

FIG. 2 is a block diagram illustrating an example of the functional structure of the camera device 10 (pan/tilt camera).

The camera device 10 can capture both still images and moving images and mainly comprises the imaging unit 20, an imaging direction adjustment unit 30, a control unit 40, a signal processing unit 41, a camera-side tracking processing unit 65, a camera-side target information correction unit 64, a camera-side display unit 61, operation unit 60, a memory 62, a camera-side communication unit 50, and a camera-side communication monitoring unit 51.

The imaging unit 20 includes, for example, an imaging lens 22 and an imaging element (CMOS) 24 and continuously acquire captured image data. The imaging lens 22 is a prime lens or a zoom lens and forms an object image on an imaging surface of the imaging element 24. A focus lens, a variable magnification lens (in the case of a zoom lens), and a stop 23 included in the imaging lens 22 are driven by a lens driving unit 26.

The imaging element 24 is a color imaging element in which color filters of three primary colors, that is, red (R), green (G), and blue (B) are arranged in a predetermined pattern (a Bayer array, a G stripe R/B full-checkered pattern, an X-Trans (registered trademark) array, or a honeycomb array) for each pixel and is a complementary metal oxide semiconductor (CMOS) image sensor. However, the imaging element 24 is not limited to the CMOS image sensor and may be a charge coupled device (CCD) image sensor.

The imaging element 24 is driven by a CMOS driver 28 including, for example, a vertical driver and a horizontal driver and a timing generator (TG) 29. A pixel signal corresponding to the amount of incident object light (a digital signal corresponding to signal charge accumulated in each pixel) is read from the imaging element 24.

The imaging direction adjustment unit 30 comprises, for example, a pan/tilt mechanism 32, the pan driving unit 34, and the tilt driving unit 36 and adjusts the imaging direction of the imaging unit 20. As illustrated in FIG. 1, the pan/tilt mechanism 32 includes a pan mechanism that rotates the imaging unit 20 in the horizontal direction (pan direction) with respect to the device body 12 and a tilt mechanism that rotates the imaging unit 20 in the vertical direction (tilt direction) with respect to the device body 12. The pan/tilt mechanism 32 includes a home position sensor that detects the reference position of a rotation angle (pan angle) in the pan direction and a home position sensor that detects the reference position of an inclination angle (tilt angle) in the tilt direction.

The pan driving unit 34 and the tilt driving unit 36 each include a stepping motor and a motor driver and output a driving force to the pan/tilt mechanism 32 to drive the pan/tilt mechanism 32.

The signal processing unit 41 performs signal processing, such as an offset process, a gain control process including white balance correction and sensitivity correction, a gamma correction process, demosaic processing (demosaicing process), and an RGB/YC conversion process, for a digital image signal (captured image data) which is input from the imaging unit 20. Here, the demosaicing process is a process which calculates all color information of each pixel from a mosaic image corresponding to the color filter array of a single-plate-type color imaging element and is also referred to as a synchronization process. For example, in the case of an imaging element including color filters of three colors, that is, R, G, and B, the demosaicing process calculates the color information of all of R, G, and B of each pixel from an RGB mosaic image. In addition, the RGB/YC conversion process is a process which generates brightness data Y and color difference data items Cb and Cr from the demosaiced RGB image data. The signal processing unit 41 transmits the captured image data subjected to the above-mentioned processes to the camera-side tracking processing unit 65.

The camera-side tracking processing unit 65 analyzes the captured image data acquired from the signal processing unit 41 to acquire first target information indicating the position of a tracking target.

The camera-side tracking processing unit 65 has a function that, when an object (tracking target) is specified as the tracking target, detects the coordinates indicating the position of the tracking target even when the tracking target moves. Specifically, first, the tracking target is automatically or manually set. Then, the image of the tracking target is detected from a captured moving image (captured image data) which is sequentially obtained from the signal processing unit 41 by a face detection process or a pattern matching process. Here, since the face detection process or the pattern matching process performed in the camera-side tracking processing unit 65 is known, the description thereof will not be repeated. In addition, as another method for detecting the object, in a case in which a moving body is the object, the object may be detected by a moving body detection method.

The camera-side target information correction unit 64 corrects the first target information calculated by the camera-side tracking processing unit 65 on the basis of second target information calculated by a terminal-side tracking processing unit 191 (FIG. 3) of the terminal device 100. The camera-side target information correction unit 64 may directly acquire the first target information from the camera-side tracking processing unit 65 or may acquire the first target information through the control unit 40. In addition, the camera-side target information correction unit 64 acquires the second target information through the control unit 40. The camera-side target information correction unit 64 will be described in detail below.

The control unit 40 comprises, as main components, an imaging control unit 42, a lens control unit 43, a direction control unit 44, and an operation control unit 46.

The imaging control unit 42 issues, for example, an instruction to discharge the charge accumulated in a capacitor of each pixel of the imaging element 24 or an instruction to read a signal corresponding to the charge accumulated in the capacitor through the CMOS driver 28 and the TG 29 and performs imaging control.

The lens control unit 43 controls the focus lens, the variable magnification lens, and the stop 23 included in the imaging lens 22 through the lens driving unit 26 and performs, for example, auto focus (AF) control for moving the focus lens to an in-focus position. The AF control is performed by integrating the absolute values of high-frequency components of a digital signal corresponding to an AF area, detecting an in-focus position where the integrated value (AF evaluation value) is the maximum, and moving the focus lens to the detected in-focus position.

The direction control unit 44 controls the imaging direction adjustment unit 30. Specifically, in a case in which an automatic tracking mode is set, the direction control unit 44 controls the imaging direction adjustment unit 30 such that an object (tracking target) detected by the camera-side tracking processing unit 65 is located at the center of the angle of view. In a case in which the automatic tracking mode is not set, the direction control unit 44 controls the imaging direction adjustment unit 30 in response to an instruction transmitted from the operation unit 60 or the terminal device 100. The direction control unit 44 controls the imaging direction adjustment unit 30 on the basis of the first target information or the second target information, regardless of whether the automatic tracking mode is set.

The operation control unit 46 controls the operation of the imaging control unit 42, the lens control unit 43, and the direction control unit 44. For example, the operation control unit 46 controls the direction control unit 44 such that the pan/tilt mechanism 32 is operated or stopped. In addition, the operation control unit 46 transmits the first target information and the second target information to the direction control unit 44 and controls the pan/tilt mechanism 32 through the direction control unit 44 such that the tracking target is tracked. The operation control unit 46 stops the recording of a captured moving image to the memory 62 or cancels the stopping. The operation control unit 46 stops the capture of a moving image by the imaging unit 20 and changes the mode to a power saving mode or cancels the power saving mode.

The camera-side communication unit 50 performs wireless communication with the external terminal device 100 illustrated in FIG. 1 and receives various operation instructions from the terminal device 100, using wireless communication. For example, the camera-side communication unit 50 receives the second target information calculated in the terminal-side tracking processing unit 191 (FIG. 3) of the terminal device 100. In addition, the camera-side communication unit 50 can transmit, for example, a recording image to the terminal device 100 and can transmit the moving image (captured image data) which has been captured by the imaging unit 20 and then processed by the signal processing unit 41 to the terminal device 100. In this way, a recording image, such as a moving image, can be recorded in the terminal device 100 or an external recording medium or a live view image can be displayed on a display unit (display input unit 120) of the terminal device 100.

The camera-side communication monitoring unit 51 monitors a communication state between the camera-side communication unit 50 and the terminal-side communication unit 110. The camera-side communication monitoring unit 51 can monitor the communication state between the camera-side communication unit 50 and the terminal-side communication unit 110, using a known method. For example, the camera-side communication monitoring unit 51 can monitor the communication state between the camera-side communication unit 50 and the terminal-side communication unit 110 on the basis of radio waves transmitted from the terminal-side communication unit 110.

The operation unit 60 includes, for example, the imaging start button 19 (FIG. 1) and a power button which are provided in the device body 12 and can be used to input the same operation instruction as the operation instruction from the terminal device 100.

The camera-side display unit 61 functions as an image display unit which displays, for example, a live view image and a playback image and also functions as a user interface unit for displaying a menu screen and for setting and inputting various parameters, in cooperation with the operation unit 60.

The memory 62 includes, for example, a synchronous dynamic random access memory (SDRAM) serving as a storage area that temporarily stores still images or moving images or a work area that performs various types of arithmetic processing or a read only memory (ROM) that stores an imaging program and various kinds of data required for control. The operation control unit 46 controls the recording of the moving image captured by the imaging unit 20 to the memory 62.

Figure 3:
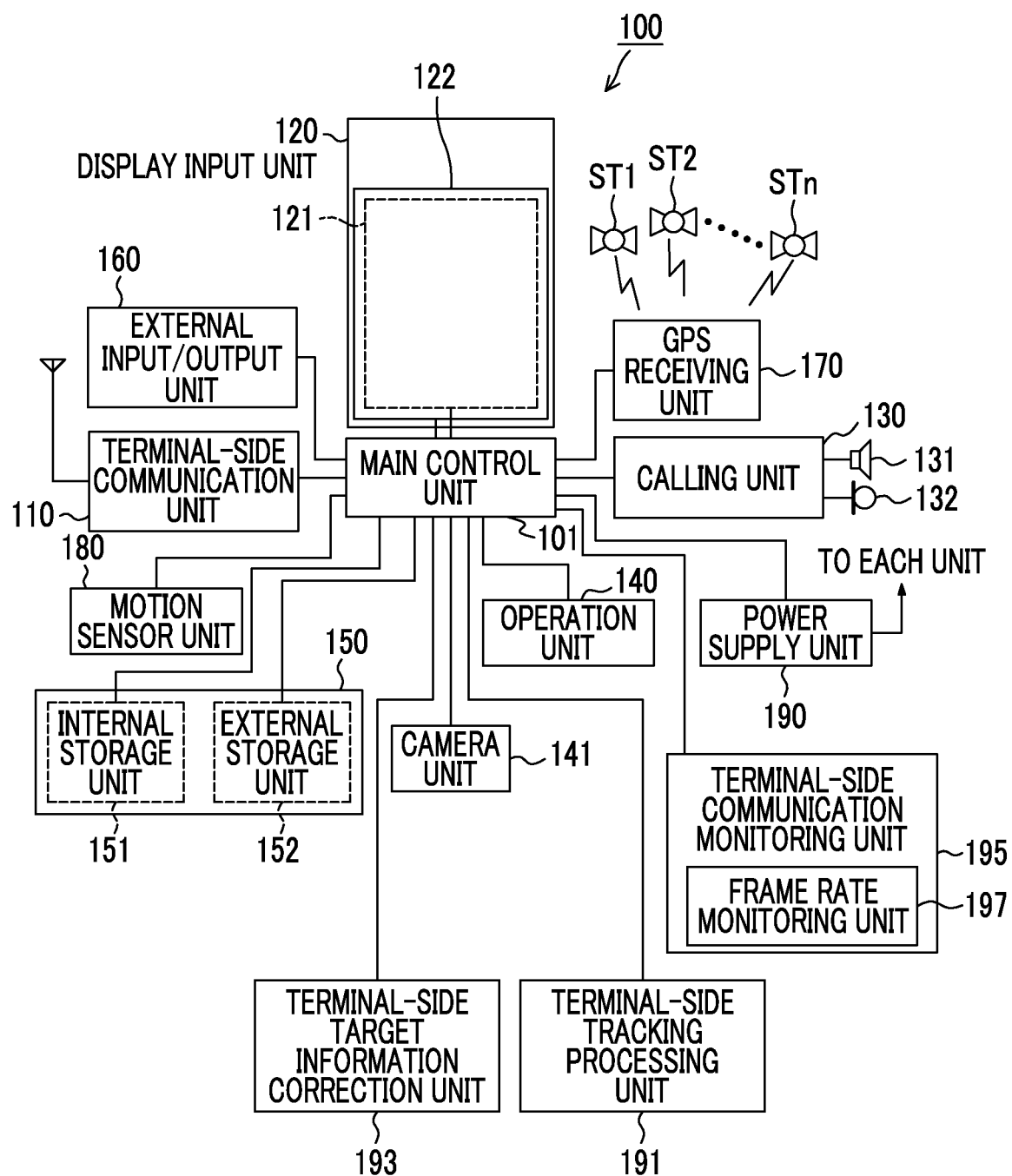
FIG. 3 is a block diagram illustrating an example of the functional structure of a terminal device.

FIG. 3 is a block diagram illustrating an example of the functional structure of the terminal device 100.

As shown in FIG. 3, the terminal device 100 comprises, as main components, a terminal-side communication unit 110, the display input unit 120, a calling unit 130, an operation unit 140, a camera unit 141, a storage unit 150, an external input/output unit 160, a global positioning system (GPS) receiving unit 170, a motion sensor unit 180, a power supply unit 190, a terminal-side tracking processing unit 191, a terminal-side target information correction unit 193, a terminal-side communication monitoring unit 195, and a main control unit 101. In addition, the terminal device 100 has, as a main function, a wireless communication function which performs mobile wireless communication through a base station apparatus BS and a mobile communication network NW.

The terminal-side communication unit 110 performs wireless communication with the base station apparatus BS which is accommodated in the mobile communication network NW in response to an instruction from the main control unit 101. The wireless communication is used to transmit and receive various types of file data, such as voice data and image data, and electronic mail data or to receive, for example, web data or streaming data. In this example, the terminal-side communication unit 110 of the terminal device 100 transmits various operation instruction inputs to the camera device 10 or receives, for example, a live view image (captured image data) and a recording image from the camera device 10.

The display input unit 120 displays, for example, images (still images and moving images) or text information to visually transmit information to the user and detects the user's operation for the displayed information under the control of the main control unit 101. The display input unit 120 comprises a display panel 121 and an operation panel (touch panel) 122. It is preferable that the display panel 121 is a 3D display panel in a case in which a 3D image is viewed.

The display panel 121 uses, for example, a liquid crystal display (LCD) or an organic electro-luminescence display (OELD) as a display device.

The operation panel (input unit) 122 is a device that is provided such that an image displayed on a display surface of the display panel 121 is visually recognized and detects one or a plurality of coordinate points operated by a finger of the user or a stylus. When the device is operated by a finger of the user or a stylus, a detection signal which is generated by the operation is output to the main control unit 101. Then, the main control unit 101 detects an operation position (coordinates) on the display panel 121 on the basis of the received detection signal.

As illustrated in FIG. 1, the display panel 121 and the operation panel 122 of the terminal device 100 are integrated to form the display input unit 120 and the operation panel 122 is provided so as to completely cover the display panel 121. In a case in which this structure is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of a housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises a speaker 131 and a microphone 132. The calling unit 130 converts the voice of the user which is input through the microphone 132 into voice data which can be processed by the main control unit 101 and outputs the converted voice data to the main control unit 101. In addition, the calling unit 130 decodes voice data received by the terminal-side communication unit 110 or the external input/output unit 160 and outputs the decoded voice data from the speaker 131. As illustrated in FIG. 1, for example, the speaker 131 and the microphone 132 can be mounted on the same surface as the display input unit 120.

The operation unit 140 is a hardware key which uses, for example, a key switch and receives instructions from the user. For example, the operation unit 140 is a push button switch which is mounted on a lower surface of a lower portion of the display input unit 120 of the housing 102 of the terminal device 100, is turned on when it is pressed by, for example, a finger, and is turned off by the restoring force of a spring when the finger is taken off.

The storage unit 150 stores a control program or control data of the main control unit 101, address data which is associated with, for example, the names or phone numbers of communication partners, and transmitted and received electronic mail data, web data which is downloaded by web browsing, or downloaded content data. In addition, the storage unit 150 temporarily stores, for example, streaming data. The storage unit 150 includes an internal storage unit 151 which is provided in a smart phone and an external storage unit 152 which has a slot for a detachable external memory. The internal storage unit 151 and the external storage unit 152 forming the storage unit 150 may be implemented by a storage medium, such as a flash memory, a hard disk, a multimedia-card-micro-type memory, a cardtype memory (for example, a MicroSD (registered trademark) memory), a random access memory (RAM), or a read only memory (ROM).

The external input/output unit 160 functions as an interface with all of the external apparatuses connected to the terminal device 100 and is directly or indirectly connected to other external apparatuses by communication (for example, universal serial bus (USB) communication) or a network (for example, the Internet, a wireless local area network (LAN), a Bluetooth (registered trademark) network, a radio frequency identification (RFID) network, an infrared data association (IrDA (registered trademark)) network, an ultra wideband (UWB) (registered trademark) network, or a Zig-Bee (registered trademark) network).

Examples of the external apparatus connected to the terminal device 100 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a personal digital assistant (PDA) which is connected wirelessly or in a wired manner, a personal computer which is connected wirelessly or in a wired manner, and an earphone. The external input/output unit 160 can transmit data which is received from the external apparatus to each component of the terminal device 100 or can transmit data in the terminal device 100 to the external apparatus.

The GPS receiving unit 170 receives GPS signals transmitted from GPS satellites ST1 to STn and performs a position measurement process on the basis of a plurality of received GPS signals to detect a position including the latitude, longitude, and height of the terminal device 100, in response to an instruction from the main control unit 101. When the GPS receiving unit 170 can acquire positional information from the terminal-side communication unit 110 or the external input/output unit 160 (for example, a wireless LAN), it can detect the position using the positional information.

The motion sensor unit 180 comprises, for example, a triaxial acceleration sensor and detects the physical movement of the terminal device 100 in response to an instruction from the main control unit 101. When the physical movement of the terminal device 100 is detected, the moving direction or acceleration of the terminal device 100 is detected. The detection result is output to the main control unit 101.

The power supply unit 190 supplies power which is stored in a battery (not illustrated) to each unit of the terminal device 100 in response to an instruction from the main control unit 101.

The main control unit 101 comprises a microprocessor, operates on the basis of the control program or control data stored in the storage unit 150, and controls the overall operation of each unit of the terminal device 100. The main control unit 101 has an application processing function and a mobile communication control function of controlling each unit of a communication system in order to perform voice communication or data communication through the terminal-side communication unit 110.

The application processing function is implemented by the operation of the main control unit 101 based on the application software which is stored in the storage unit 150.

Examples of the application processing function include an infrared communication function which controls the external input/output unit 160 such that data communication with an opposing apparatus is performed, an electronic mail function which transmits and receives electronic mail, and a web browsing function which browses web pages.

The main control unit 101 has an image processing function that displays a video on the display input unit 120 on the basis of image data (still image data or moving image data) such as received data or downloaded streaming data. The image processing function means the function of the main control unit 101 decoding the image data, performing image processing for the decoding result, and displaying the image on the display input unit 120.

The main control unit 101 performs display control for the display panel 121 and operation detection control for detecting the user's operation through the operation unit 140 and the operation panel 122.

The main control unit 101 performs display to display a software key, such as an icon for starting application software or a scroll bar, or a window for creating electronic mail. The scroll bar means a software key for receiving an instruction to move a displayed portion of an image that is too large to fit into the display region of the display panel 121.

The main control unit 101 performs operation detection control to detect the user's operation through the operation unit 140 and the operation panel 122.

In addition, the main control unit 101 performs the operation detection control to detect the user's operation through the operation unit 140, to receive an operation for the icon or the input of a character string to an input field of the window through the operation panel 122, or to receive a request to scroll the displayed image through the scroll bar.

The main control unit 101 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 101 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which performs electronic imaging (imaging) using an imaging element such as a complementary metal oxide semiconductor (CMOS) sensor or a charge-coupled device (CCD).

The camera unit 141 can convert captured image data into image data which is compressed in, for example, a Joint Photographic Coding Experts Group (JPEG) format and record the converted image data in the storage unit 150 or output the converted image data through the external input/output unit 160 or the terminal-side communication unit 110, under the control of the main control unit 101.

In the terminal device 100 illustrated in FIG. 1, the camera unit 141 is mounted on the same surface as the display input unit 120. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the terminal device 100. For example, the image captured by the camera unit 141 can be displayed on the display panel 121 or the image captured by the camera unit 141 can be used as one of the operation inputs of the operation panel 122. When detecting the position, the GPS receiving unit 170 may detect the position with reference to the image from the camera unit 141. In addition, the optical axis direction of the camera unit 141 in the terminal device 100 may be determined or the current usage environment may be determined, with reference to the image from the camera unit 141, using the triaxial acceleration sensor or without using the triaxial acceleration sensor. Of course, the image from the camera unit 141 may be used in the application software.

In this example, application software for operating the camera device 10 is downloaded through, for example, a network and is stored in the storage unit 150. The main control unit 101 is operated by the application processing function of the terminal device 100 according to the downloaded application software to make the general-purpose terminal device 100 function as a user interface unit for operating the camera device 10.

The terminal-side tracking processing unit 191 analyzes captured image data to acquire the second target information indicating the position of the tracking target and outputs the second target information to the camera device 10 through the terminal-side communication unit 110. That is, the terminal-side tracking processing unit 191 has a function of detecting the coordinates of the position of the tracking target, similarly to the camera-side tracking processing unit 65. Specifically, the terminal-side tracking processing unit 191 detects the tracking target, using a face detection process or a pattern matching process. Since the face detection process or the pattern matching process is known, the description thereof will not be repeated.

As described above, in the camera device 10, the camera-side tracking processing unit 65 analyzes the captured image data to calculate the first target information. In the terminal device 100, the terminal-side tracking processing unit 191 analyzes the captured image data to calculate the second target information.

Examples of the terminal device 100 include a smart phone and a tablet terminal. In general, in a case in which a smart phone or a tablet terminal is used as the terminal device 100, in many cases, the calculation capability of the terminal-side tracking processing unit 191 of the terminal device 100 is higher than the calculation capability of the camera-side tracking processing unit 65 of the camera device 10 since the calculation capability of the smart phone and the tablet terminal has rapidly progressed in recent years. Therefore, in the invention, in a case in which the communication state between the camera device 10 and the terminal device 100 is good, it is possible to rapidly perform tracking with high accuracy on the basis of the second target information. Even in a case in which the communication state between the camera device 10 and the terminal device 100 is bad, it is possible to continue to track the tracking target on the basis of the first target information.

The terminal-side target information correction unit 193 corrects the second target information on the basis of the first target information. The terminal-side target information correction unit 193 may correct the second target information at any time or may correct the second target information in a specific case. For example, in a case in which the communication state monitored by the camera-side communication monitoring unit 51 or the terminal-side communication monitoring unit 195 changes to a disconnected state and then changes to a reconnected state, the terminal-side target information correction unit 193 corrects the second target information. For example, in a case in which the frame rate monitored by the frame rate monitoring unit 197 changes to a second threshold value or less and then changes to a third threshold value or more, the terminal-side target information correction unit 193 corrects the second target information with the first target information. The terminal-side target information correction unit 193 can correct the second target information with the first target information, using various methods. For example, the terminal-side target information correction unit 193 substitutes the content (coordinates) of the second target information with the content (coordinates) of the first target information to correct the second target information. Here, the second threshold value and the third threshold value are arbitrary values. For example, the second threshold value can be set to a value that is less than the third threshold value in order to provide hysteresis.

The terminal-side communication monitoring unit 195 monitors a communication state with the camera-side communication unit 50. That is, the terminal-side communication monitoring unit 195 monitors the communication state between the camera-side communication unit 50 and the terminal-side communication unit 110. The terminal-side communication monitoring unit 195 can monitor the communication state between the camera-side communication unit 50 and the terminal-side communication unit 110, using various methods. For example, the terminal-side communication monitoring unit 195 may include a frame rate monitoring unit 197. The frame rate monitoring unit 197 may monitor a frame rate between the camera-device-side communication unit and the terminal-side communication unit 110 to monitor the communication state.

Next, the direction control unit 44 (see FIG. 2) provided in the camera device 10 will be described.

FIG. 4 is a diagram illustrating the tracking target information input to the direction control unit 44. At least one of the first target information or the second target information is input to the direction control unit 44. The direction control unit 44 may acquire the first target information from the camera-side tracking processing unit 65 or may acquire the first target information from the camera-side target information correction unit 64. The direction control unit 44 may acquire the second target information from the camera-side communication unit 50.

Figure 4A:
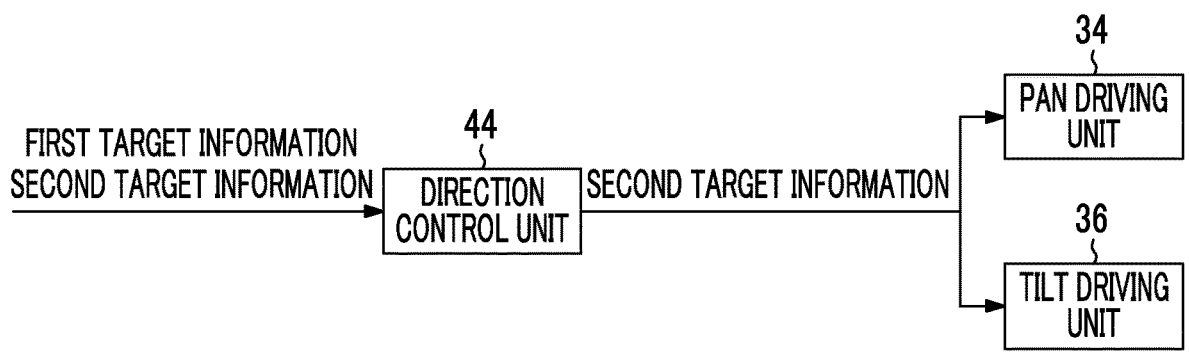
FIGS. 4A and 4B are diagrams illustrating a direction control unit.

FIG. 4A illustrates, for example, a case in which the communication state between the camera device 10 and the terminal device 100 is good. In this case, the first target information corrected by the camera-side target information correction unit 64 and the second target information calculated by the terminal-side tracking processing unit 191 are input to the input direction control unit 44. In a case in which both the first target information and the second target information are input, the direction control unit 44 controls the imaging direction adjustment unit 30 on the basis of the second target information.

As described above, in general, the terminal device 100 has a higher calculation capability to perform a tracking process than the camera device and the second target information has a higher reliability than the first target information. Therefore, in a case in which the first target information and the second target information are acquired, the direction control unit 44 outputs the second target information to the pan driving unit 34 and the tilt driving unit 36 of the imaging direction adjustment unit 30. In a case in which the communication state between the camera device 10 and the terminal device 100 is good, the direction control unit 44 controls the imaging direction adjustment unit 30, using the second target information. Therefore, it is possible to rapidly perform tracking with high accuracy.

Figure 4B:
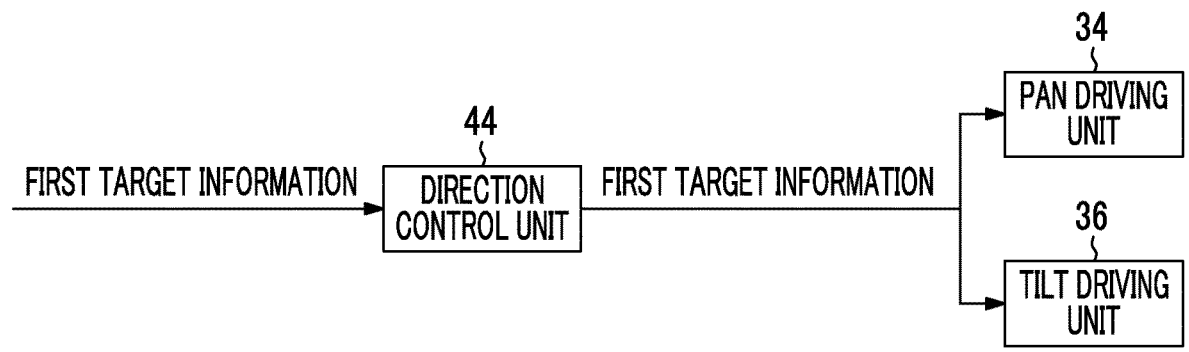

FIG. 4B illustrates, for example, a case in which the communication state between the camera device 10 and the terminal device 100 is bad. In a case in which the communication state between the camera device 10 and the terminal device 100 is bad, it is difficult for the camera device 10 to acquire the second target information from the terminal device 100. Therefore, only the first target information calculated by the camera-side tracking processing unit 65 is input to the direction control unit 44. Then, the direction control unit 44 controls the imaging direction adjustment unit 30 on the basis of the input first target information.

In a case in which the first target information has been corrected by the camera-side target information correction unit 64, the corrected first target information is input to the direction control unit 44. In a case in which the first target information has not been corrected, the first target information which has not been corrected is input to the direction control unit 44.

Next, the camera-side target information correction unit 64 will be described.

Figure 5:
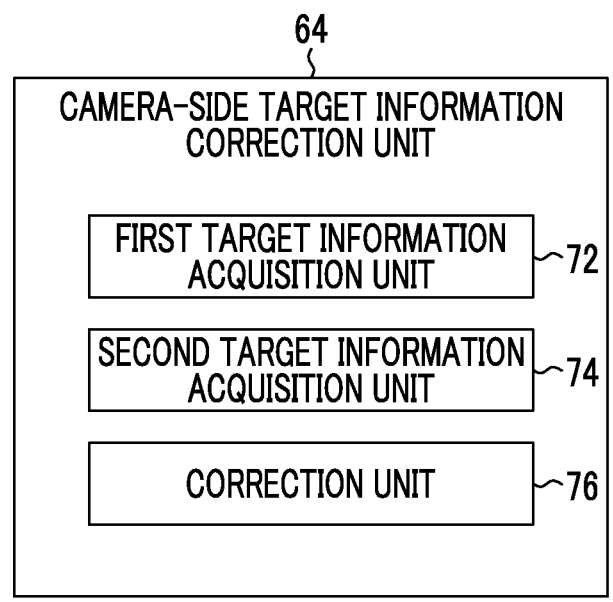
FIG. 5 is a block diagram illustrating an example of the functional structure of a camera-side target information correction unit.

FIG. 5 is a block diagram illustrating an example of the functional structure of the camera-side target information correction unit 64. The camera-side target information correction unit 64 includes, as main components, a first target information acquisition unit 72, a second target information acquisition unit 74, and a correction unit 76.

The first target information acquisition unit 72 acquires the first target information from the camera-side tracking processing unit 65. The second target information acquisition unit 74 acquires the second target information, which has been acquired from the terminal device 100 by the camera-side communication unit 50, through the control unit 40.

The correction unit 76 corrects the first target information on the basis of the second target information. The correction unit 76 can correct the first target information on the basis of the second target information, using various methods. For example, the correction unit 76 substitutes the content of the first target information with the content of the second target information to correct the first target information. That is, in a case in which the content of the first target information is the coordinates of the tracking target calculated by the camera-side tracking processing unit 65 and the content of the second target information is the coordinates of the tracking target calculated by the terminal-side tracking processing unit 191, the correction unit 76 may substitute the coordinates of the content of the first target information with the coordinates of the content of the second target information to correct the first target information.

The first target information corrected by the correction unit 76 is transmitted to the camera-side tracking processing unit 65 and is used for the subsequent tracking process.

Next, the usage pattern of the first target information corrected by the camera-side target information correction unit 64 will be described. The corrected first target information is mainly used in two patterns. As a first usage pattern, in a case in which the communication state between the camera device 10 and the terminal device 100 is bad, the direction control unit 44 controls the imaging direction adjustment unit 30, using the corrected first target information. As a second usage pattern, the tracking target is tracked using the first target information corrected by the camera-side tracking processing unit 65. Hereinafter, the process of tracking the tracking target using the first target information corrected by the camera-side tracking processing unit 65 will be described.

FIG. 6 is a diagram illustrating a case in which a tracking target is detected at a second time after a first time on the basis of target information acquired by the camera-side tracking processing unit 65 at the first time.

Figure 6A:
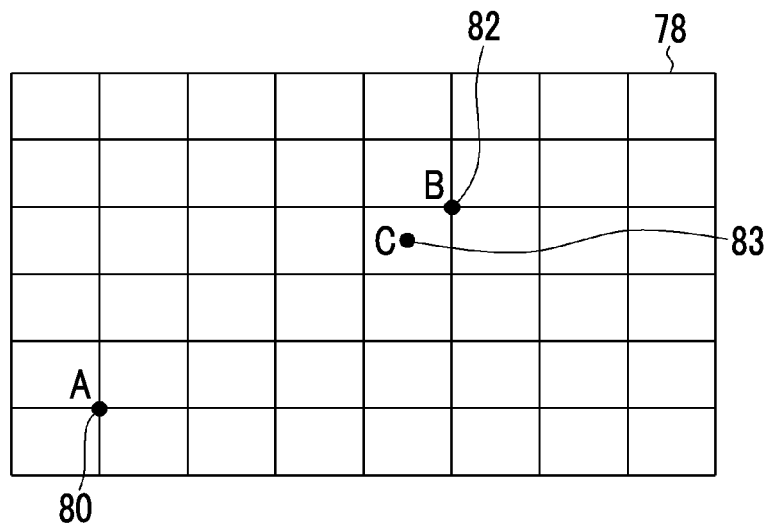
FIGS. 6A to 6C are diagrams illustrating a camera-side tracking processing unit.

FIG. 6A illustrates a first captured image 78 corresponding to first captured image data acquired at the first time. In the case shown in FIG. 6A, the tracking target is at a C-point 83. The camera-side tracking processing unit 65 analyzes the first captured image data to acquire the coordinates of an A-point 80 which are the first target information. In addition, the terminal-side tracking processing unit 191 analyzes the first captured image data to acquire the coordinates of a B-point 82 which are the second target information. Here, it is ideal to accurately specify the coordinates of the tracking target (C-point 83). However, in some cases, it is difficult to accurately specify the coordinates of the tracking target (C-point 83) due to various causes (see the A-point 80, the B-point 82, and the C-point 83 in FIG. 6A). In addition, in some cases, the first target information (the coordinates of the A-point 80) calculated by the camera-side tracking processing unit 65 is different from the second target information (the coordinates of the B-point 82) calculated by the terminal-side tracking processing unit 191 due to, for example, the calculation capability of the camera-side tracking processing unit 65 and the terminal-side tracking processing unit 191. In many cases, since the calculation capability of the terminal device 100 is generally higher than that of the camera device 10, the second target information indicates the coordinates closer to the tracking target than the first target information.

Then, the camera-side target information correction unit 64 corrects the first target information on the basis of the second target information. In this way, even when the first target information calculated by the camera-side tracking processing unit 65 is inaccurate, the first target information is corrected on the basis of the second target information. Therefore, it is possible to accurately track the tracking target.

Since the camera-side target information correction unit 64 corrects the first target information on the basis of the second target information, it is possible to improve the accuracy of the first target information and to smoothly shift the tracking process performed in the camera device 10 in a case in which the communication state between the camera device 10 and the terminal device 100 is bad to a tracking process performed in a remote device.

Figure 6B:
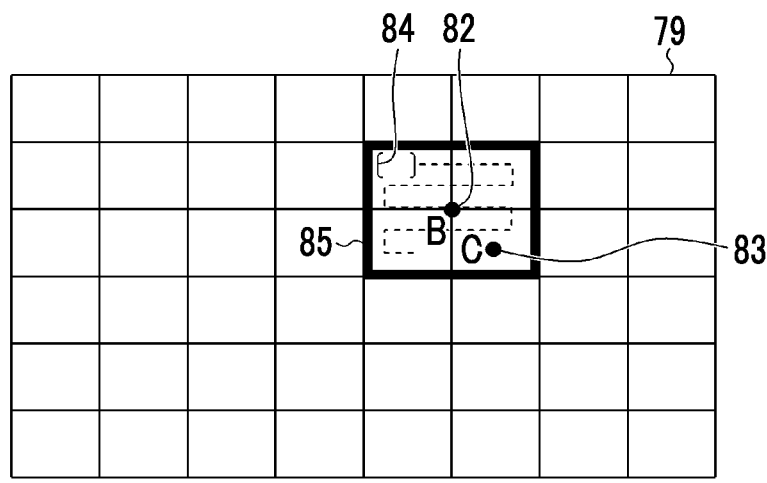
Figure 6C:
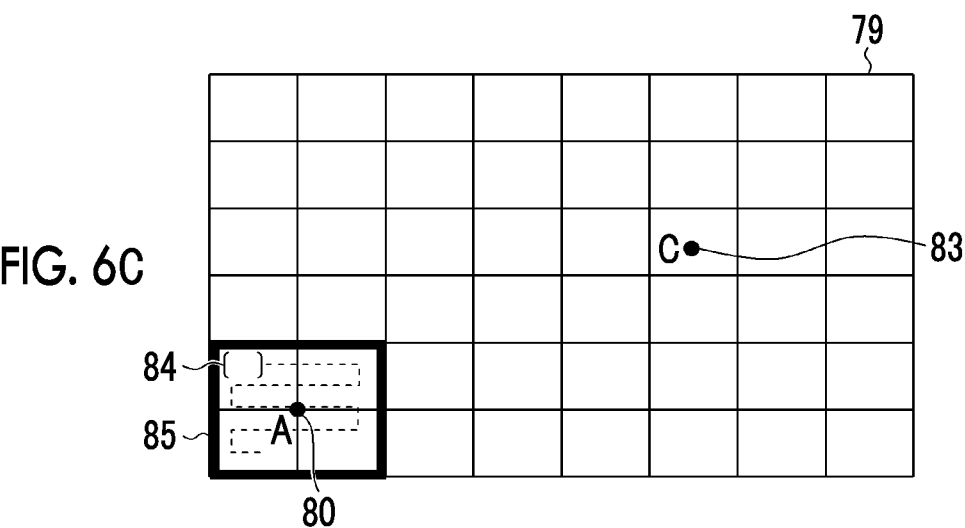

FIG. 6B and FIG. 6C illustrate a second captured image 79 corresponding to first captured image data acquired at the second time. Here, in a case in which a tracking target is detected in the second captured image data, the tracking target is detected on the basis of the coordinates of the tracking target acquired at the first time.

In the case shown in FIG. 6B, an object detection region 84 is scanned in a scanning region 85, using the B-point 82 as the center, to detect the tracking target. That is, the camera-side tracking processing unit 65 detects the tracking target (C-point 83) at the second time, using the first target information (the coordinates of the B-point 82) corrected by the camera-side target information correction unit 64. In the case shown in FIG. 6C, the object detection region 84 is scanned in the scanning region 85, using the A-point 80 as the center, to detect the tracking target. That is, the camera-side tracking processing unit 65 detects the tracking target (C-point 83) at the second time, using the first target information (the coordinates of the A-point 80) which has not been corrected by the camera-side target information correction unit 64.

As shown in FIG. 6B, when the accuracy of the positional information (coordinates) of the tracking target at the first time is high, the tracking target is rapidly detected at the second time with high accuracy. As shown in FIG. 6C, when the accuracy of the positional information (coordinates) of the tracking target at the first time is low, it takes time to detect the tracking target at the second time or the detection of the tracking target at the second time is inaccurate or impossible. For this reason, the camera-side target information correction unit 64 corrects the first target information on the basis of the second target information and the camera-side tracking processing unit 65 tracks the tracking target, using the corrected first target information. Therefore, it is possible to rapidly perform tracking with high accuracy.

Figure 7:
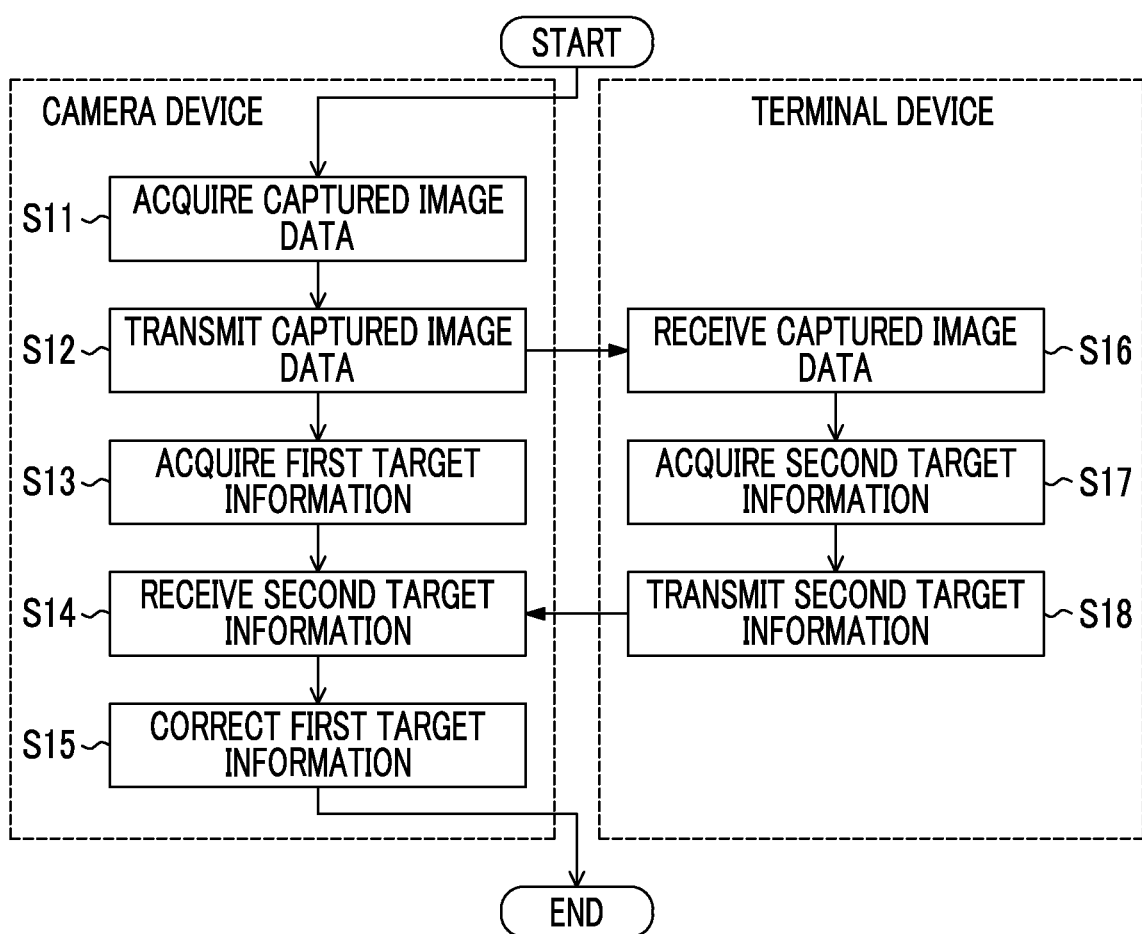
FIG. 7 is a flowchart illustrating the flow of the operation of the camera device and the terminal device.

FIG. 7 is a flowchart illustrating the flow of the operation of the camera device 10 and the terminal device 100. First, the imaging unit 20 of the camera device 10 acquires captured image data (Step S11). Then, the camera-side communication unit 50 of the camera device 10 transmits the acquired captured image data to the terminal device 100 (Step S12). The camera-side tracking processing unit 65 acquires the first target information from the captured image data (Step S13).

Then, the terminal-side communication unit 110 of the terminal device 100 receives the captured image data (Step S16) and the terminal-side tracking processing unit 191 analyzes the received captured image data to acquire the second target information (Step S17). Then, the terminal-side communication unit 110 transmits the second target information to the camera device 10 (Step S18).

The camera-side communication unit 50 of the camera device 10 receives the transmitted second target information (Step S14). Then, the camera-side target information correction unit 64 corrects the first target information on the basis of the second target information (Step S15).

As described above, according to this embodiment, the imaging direction of the imaging unit 20 is controlled on the basis of the first target information which is the analysis result of the captured image data by the camera device 10 or the second target information which is the analysis result of the captured image data by the terminal device 100. Therefore, in this embodiment, in a case in which the communication state between the camera device 10 and the terminal device 100 is good, it is possible to rapidly perform tracking with high accuracy on the basis of the second target information. Even in a case in which the communication state between the camera device 10 and the terminal device 100 is bad, it is possible to continue to track the tracking target on the basis of the first target information.

In addition, according to this embodiment, since the first target information is corrected on the basis of the second target information, it is possible to improve the accuracy of the first target information and to smoothly shift the tracking process performed in the camera device 10 in a case in which the communication state between the camera device 10 and the terminal device 100 is bad to a tracking process performed in a remote device.

The above-mentioned structures and functions can be appropriately implemented by arbitrary hardware, arbitrary software, or a combination thereof. For example, the invention can also be applied to a program that causes a computer to perform each of the above-mentioned processing steps (procedures), a computer-readable recording medium (non-transitory medium) that stores the program, or a computer in which the program can be installed.

Modification Example 1

Next, a modification example (Modification Example 1) of the camera device 10 will be described.

Figure 8:
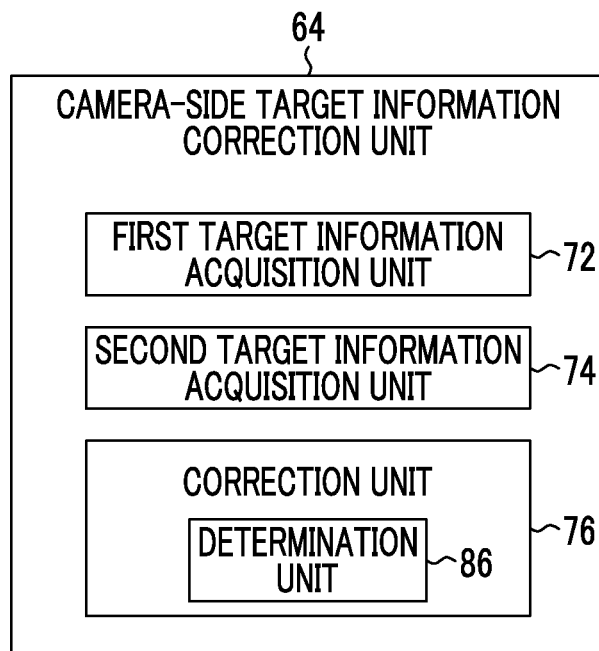
FIG. 8 is a block diagram illustrating an example of the functional structure of a camera-side target information correction unit in Modification Example 1 of the camera device.

FIG. 8 is a block diagram illustrating an example of the functional structure of a camera-side target information correction unit 64 in Modification Example 1 of the camera device 10. The camera-side target information correction unit 64 in Modification Example 1 comprises a first target information acquisition unit 72, a second target information acquisition unit 74, and a correction unit 76. The correction unit 76 includes a determination unit 86. The same functional blocks as those described in FIG. 5 are denoted by the same reference numerals and the description thereof will not be repeated.

The determination unit 86 determines whether to perform the correction of a first target information by the camera-side target information correction unit 64. For example, the determination unit 86 determines whether to correct the first target information on the basis of the position of the tracking target specified on the basis of the first target information and the position of the tracking target specified on the basis of the second target information. That is, the determination unit 86 determines to correct the first target information in a case in which a difference distance between the first target information and the second target information is equal to or greater than a first threshold value and determines not to correct the first target information in a case in which the difference distance is less than the first threshold value. Here, the difference distance indicates the distance between the position of the tracking target specified on the basis of the first target information and the position of the tracking target specified on the basis of the second target information.

In addition, the determination unit 86 may determine whether to perform the correction of the first target information by the camera-side target information correction unit 64 on the basis of the value of a frame rate which is one of the indexes indicating the communication state between the camera device 10 and the terminal device 100. For example, the camera-side target information correction unit 64 acquires the frame rate monitored by the frame rate monitoring unit 197 through the camera-side communication unit 50. In a case in which the acquired frame rate is equal to or less than a second threshold value, the camera-side target information correction unit 64 does not correct the first target information. Therefore, the camera device 10 can correct the first target information with high accuracy. Here, the first threshold value and the second threshold value are arbitrary values and may be set, considering the correction of the first target information.

In addition, the determination unit 86 may determine not to correct the first target information in a case in which the communication state between the camera device 10 and the terminal device 100 monitored by the camera-side communication monitoring unit 51 is a disconnected state.

Modification Example 2

Next, a modification example (Modification Example 2) of the camera device 10 will be described.

Figure 9:
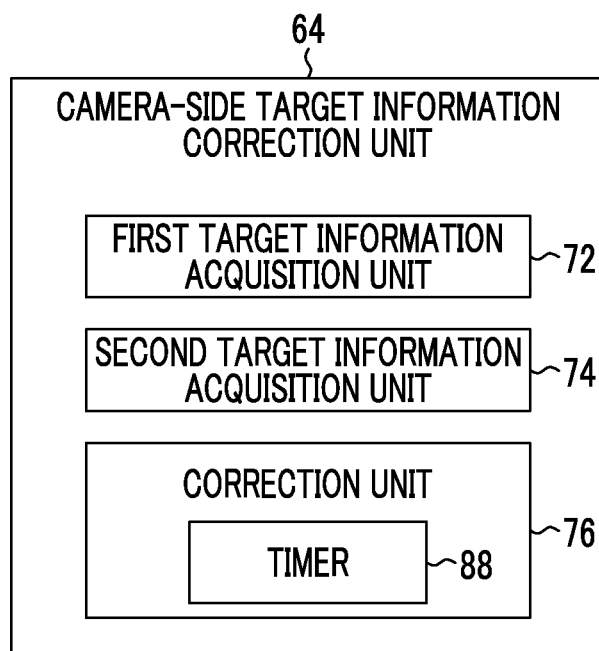
FIG. 9 is a block diagram illustrating an example of the functional structure of a camera-side target information correction unit in Modification Example 2 of the camera device.

FIG. 9 is a block diagram illustrating an example of the functional structure of a camera-side target information correction unit 64 in Modification Example 2 of the camera device 10. The camera-side target information correction unit 64 in Modification Example 2 comprises a first target information acquisition unit 72, a second target information acquisition unit 74, and a correction unit 76 and the correction unit 76 includes a timer 88. The same functional blocks as those described in FIG. 5 are denoted by the same reference numerals and the description thereof will not be repeated.

The camera-side target information correction unit 64 includes the timer 88 and determines whether to correct the first target information on the basis of information from the timer 88. That is, the camera-side target information correction unit 64 may correct the first target information on the basis of the information (time) of the timer 88. For example, the camera-side target information correction unit 64 may periodically correct the first target information on the basis of the information of the timer 88.

As such, since the camera-side target information correction unit 64 corrects the first target information on the basis of the information of the timer 88, it is possible to stably correct the first target information.

Modification Example 3

Next, a modification example (Modification Example 3) of the connection configuration between the camera device 10 and the terminal device 100 will be described.

Figure 10:
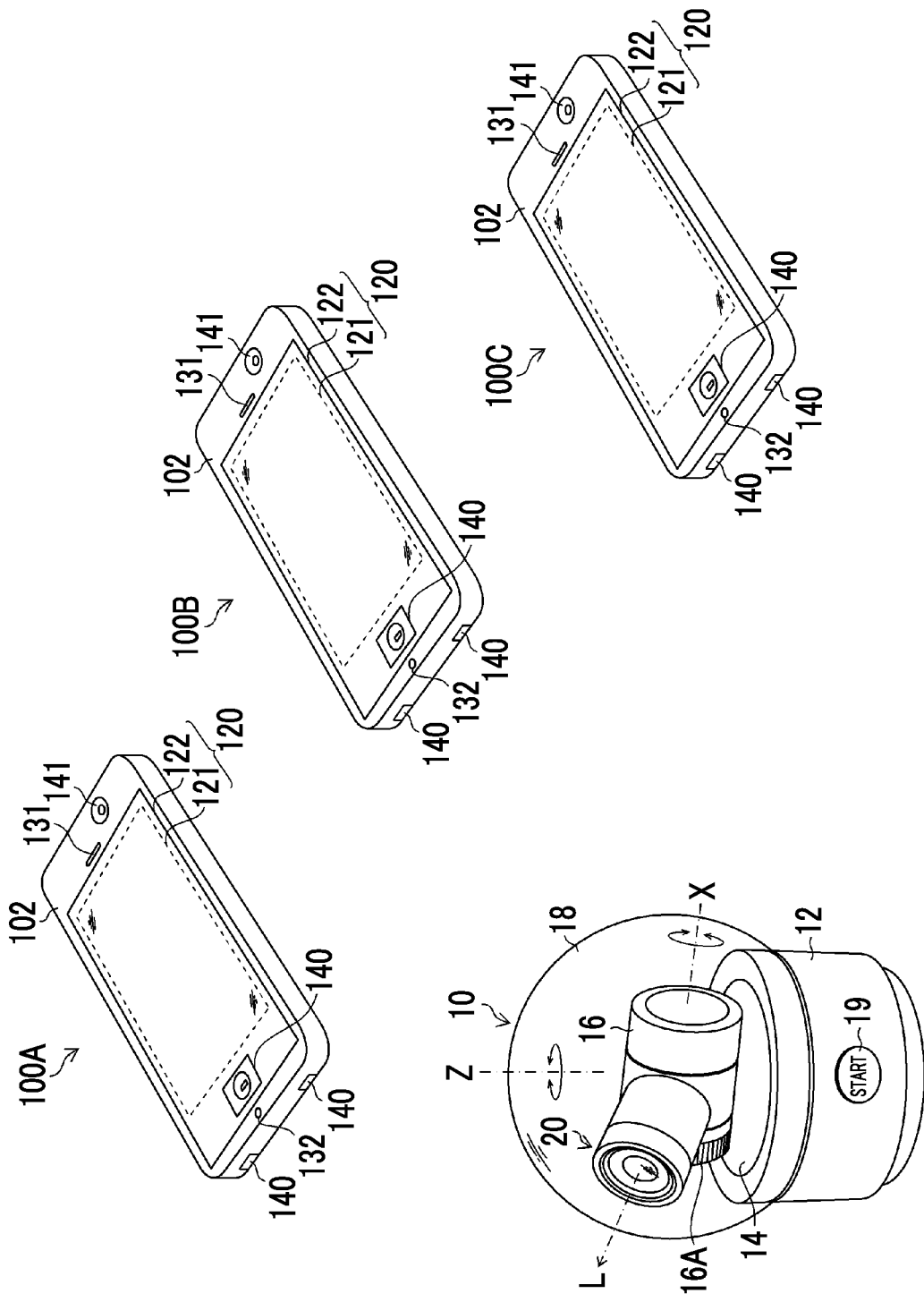
FIG. 10 is an external perspective view illustrating a camera device and a terminal device in Modification Example 3.

FIG. 10 is an external perspective view illustrating the camera device 10 and the terminal devices 100 in Modification Example 3. In the case shown in FIG. 10, the camera device 10 is connected to a plurality of terminal devices (a terminal device 100A, a terminal device 100B, and a terminal device 100C).

The camera-side target information correction unit 64 compares frame rate information items output from communication units of the terminal devices and corrects the first target information on the basis of the second target information output from the communication unit of the terminal device with the highest frame rate. That is, the camera-side target information correction unit 64 acquires the second target information from a terminal device with the highest frame rate among the terminal device 100A, the terminal device 100B, and the terminal device 100C. Therefore, it is possible to track a tracking target with high accuracy.

For example, in a case in which the frame rate of the terminal device 100A is 24 frames per second (fps), the frame rate of the terminal device 100B is 12 fps, and the frame rate of the terminal device 100C is 8 fps, the control unit 40 of the camera device 10 compares the frame rates of the terminal devices (the terminal device 100A, the terminal device 100B, and the terminal device 100C) and acquires the second target information of the terminal device 100A with the highest frame rate. In addition, the frame rate monitoring units 197 (see FIG. 3) of the terminal device 100A, the terminal device 100B, and the terminal device 100C acquire the frame rates of the terminal devices and transmit the frame rates to the camera device 10 through the terminal-side communication units 110.

As such, since the first target information is corrected on the basis of the second target information of a terminal device with the highest frame rate among a plurality of terminal devices which communicate with the camera device 10, it is possible to correct the first target information with high accuracy.

The embodiments of the invention have been described above. However, the invention is not limited to the above-described embodiments and various modifications and changes of the invention can be made without departing from the scope and spirit of the invention.

EXPLANATION OF REFERENCES

10: camera device
12: device body
14: base
16: holding portion
16A: gear
18: dome cover
19: imaging start button
20: imaging unit
22: imaging lens
23: stop
24: imaging element
26: lens driving unit
28: CMOS driver
30: imaging direction adjustment unit
32: pan/tilt mechanism
34: pan driving unit
36: tilt driving unit
40: control unit
41: signal processing unit
42: imaging control unit
43: lens control unit
44: direction control unit
46: operation control unit
50: camera-side communication unit
51: camera-side communication monitoring unit
60: operation unit
61: camera-side display unit
62: memory
64: camera-side target information correction unit
65: camera-side tracking processing unit
100: terminal device
101: main control unit
102: housing
110: terminal-side communication unit
120: display input unit
121: display panel
122: operation panel
130: calling unit
131: speaker
132: microphone
140: operation unit
141: camera unit
150: storage unit
151: internal storage unit
152: external storage unit
160: external input/output unit
170: GPS receiving unit
180: motion sensor unit
190: power supply unit
191: terminal-side tracking processing unit
193: terminal-side target information correction unit
195: terminal-side communication monitoring unit
197: frame rate monitoring unit
300: imaging system

What is claimed is:

1. A camera device comprising:
an imaging unit, including a sensor, that continuously acquires captured image data;
a pan/tilt mechanism that adjusts an imaging direction of the imaging unit;
a controller including circuitry that controls the pan/tilt mechanism, the controller further analyzes the captured image data and determines first target information based on the analyzed captured image data, the first target information indicating a position of a tracking target; and
a camera-side communication unit including circuitry that can communicate with a terminal device which operates the camera device and the camera-side communication unit receives second target information from the terminal device,
wherein, when both the first target information and the second target information are input, the controller controls the pan/tilt mechanism on the basis of the second target information,
when only one of the first target information and the second target information is input, the controller controls the pan/tilt mechanism on the basis of the only one input information of the first target information and the second target information,
wherein the controller further corrects the first target information on the basis of the second target information,
wherein the terminal device further includes a controller that monitors a frame rate of the captured image data transmitted to the camera-side communication unit,
wherein the terminal device includes a terminal-side target information correction unit that corrects the second target information on the basis of the first target information, and
when, after the frame rate monitored by the controller is equal to or less than a first frame rate threshold value, the frame rate is equal to or greater than a second frame rate threshold value, the terminal-side target information correction unit corrects the second target information.

2. The camera device according to claim 1,
wherein, on the basis of the first target information at a first time which is acquired by analyzing first captured image data acquired at the first time, the camera-side tracking processing unit analyzes second captured image data acquired at a second time after the first time to acquire the first target information at the second time, and
when the first target information at the first time is corrected on the basis of the second target information, the camera-side tracking processing unit acquires the first target information at the second time on the basis of the corrected first target information at the first time.

3. The camera device according to claim 1,
wherein the controller substitutes the content of the first target information with the content of the second target information to correct the first target information.

4. The camera device according to claim 1,
wherein the controller determines whether to correct the first target information on the basis of a position of the tracking target specified on the basis of the first target information and a position of the tracking target specified on the basis of the second target information.

5. The camera device according to claim 1,
wherein the controller calculates a difference distance indicating a distance between the position of the tracking target specified on the basis of the first target information and the position of the tracking target specified on the basis of the second target information, and
the controller corrects the first target information when the difference distance is equal to or greater than a difference distance threshold value and does not correct the first target information when the difference distance is less than the difference distance threshold value.

6. The camera device according to claim 1,
wherein the controller includes a timer and determines whether to correct the first target information on the basis of information from the timer.

7. The camera device according to claim 1,
wherein the controller periodically determines whether to correct the first target information.

8. The camera device according to claim 1,
wherein the controller does not correct the first target information when the frame rate monitored by the controller is equal to or less than a first frame rate threshold value.

9. A camera device comprising:
an imaging unit, including a sensor, that continuously acquires captured image data;
a pan/tilt mechanism that adjusts an imaging direction of the imaging unit;
a controller including circuitry that controls the pan/tilt mechanism, the controller further analyzes the captured image data and determines first target information based on the analyzed captured image data, the first target information indicating a position of a tracking target; and
a camera-side communication unit including circuitry that can communicate with a terminal device which operates the camera device and the camera-side communication unit receives second target information from the terminal device,
wherein, when both the first target information and the second target information are input, the controller controls the pan/tilt mechanism on the basis of the second target information, and
when only one of the first target information and the second target information is input, the controller controls the pan/tilt mechanism on the basis of the only one input information of the first target information and the second target information,
wherein the controller further corrects the first target information on the basis of the second target information,
wherein the terminal device further includes a controller that monitors a frame rate of the captured image data transmitted to the camera-side communication unit,
wherein a plurality of the terminal devices are connected to the camera device through terminal-side communication units of the plurality of terminal devices,
the terminal-side communication unit of each of the plurality of terminal devices outputs information of the frame rate monitored by the controller and the second target information, and
the controller compares the information items of the frame rates output from the terminal-side communication units of the terminal devices and corrects the first target information on the basis of the second target information which is output from the terminal-side communication unit of a terminal device with the highest frame rate.

10. The camera device according to claim 1, further comprising:
a communication monitor that monitors a communication state with the terminal device.

11. The camera device according to claim 10, wherein the controller does not correct the first target information when the communication state monitored by the communication monitor is a disconnected state.

12. An imaging system comprising a camera device and a terminal device, wherein:
the camera device includes:
an imaging unit, including a sensor, that continuously acquires captured image data;
a pan/tilt mechanism that adjusts an imaging direction of the imaging unit;
a camera-side controller including circuitry that controls the pan/tilt mechanism, the controller further analyzes the captured image data and determines first target information based on the analyzed captured image data, the first target information indicating a position of a tracking target; and
a camera-side communication unit including circuitry that can communicate with a terminal-side communication unit of a terminal device which operates the camera device and the camera-side communication unit receives second target information from the terminal device;
the terminal device includes:
the terminal-side communication unit including circuitry that can communicate with the camera-side communication unit; and
a terminal-side controller including circuitry that analyzes the captured image data and determines the second target information based on the analyzed captured image data, the second target information indicating the position of the tracking target and outputs the second target information through the terminal-side communication unit,
when both the first target information and the second target information are input, the camera-side controller controls the pan/tilt mechanism on the basis of the second target information,
when only one of the first target information and the second target information is input, the camera-side controller controls the pan/tilt mechanism on the basis of the only one input information of the first target information and the second target information,
wherein the camera-side controller further corrects the first target information on the basis of the second target information,
wherein the terminal-side controller monitors a frame rate of the captured image data transmitted to the camera-side communication unit,
wherein the terminal device includes a terminal-side target information correction unit that corrects the second target information on the basis of the first target information, and
when, after the frame rate monitored by the terminal-side controller is equal to or less than a first frame rate threshold value, the frame rate is equal to or greater than a second frame rate threshold value, the terminal-side target information correction unit corrects the second target information.

13. A method for controlling a camera device comprising an imaging unit, including a sensor, that continuously acquires captured image data, a pan/tilt mechanism that adjusts an imaging direction of the imaging unit, a controller including circuitry that controls the pan/tilt mechanism, the controller further analyzes the captured image data and determines first target information based on the analyzed captured image data, the first target information indicating a position of a tracking target, and a camera-side communication unit including circuitry that can communicate with a terminal device which operates the camera device and receives second target information from the terminal device, the method comprising:
when both the first target information and the second target information are input, controlling the pan/tilt mechanism on the basis of the second target information;
when only one of the first target information and the second target information is input, controlling the pan/tilt mechanism on the basis of the only one input information of the first target information and the second target information,
wherein the first target information is corrected on the basis of the second target information,
wherein a frame rate of the captured image data transmitted to the camera-side communication unit is monitored,
wherein the second target information is corrected on the basis of the first target information, and
when, after the frame rate that is monitored is equal to or less than a first frame rate threshold value, the frame rate is equal to or greater than a second frame rate threshold value, the second target information is corrected.

14. A non-transitory computer-readable tangible medium having a program that causes a computer to perform the method according to claim 13.

* * * * *